UNITED STATES PATENT OFFICE.

WALLACE APPLETON BEATTY, OF NEW YORK, N. Y., ASSIGNOR, BY DIRECT AND MESNE ASSIGNMENTS, TO GEORGE W. BEADLE, OF NEW YORK, N. Y.

MOVING-PICTURE FILM.

1,158,963.  Specification of Letters Patent.  Patented Nov. 2, 1915.

No Drawing.   Application filed January 3, 1913.   Serial No. 740,077.

*To all whom it may concern:*

Be it known that I, WALLACE APPLETON BEATTY, a citizen of the United States, residing at New York, in the county of New York and State of New York, have invented certain new and useful Improvements in Moving-Picture Films; and I do hereby declare the following to be a full, clear, and exact description of the invention, such as will enable others skilled in the art to which it appertains to make and use the same.

This invention relates to moving picture films, and has for its object to produce a product of this nature which will be non-inflammable, water and moisture resisting, and therefore, more efficient in use than the films heretofore proposed.

To these ends the invention consists in the novel film made from cellulose acetate and dioxy-diphenyl-dimethyl-methane, as will be more fully hereinafter disclosed and particularly pointed out in the claims.

In order that the invention may be more clearly understood, it is said:—In my prior application #702,046, filed June 6, 1912, entitled Artificial gums and process of producing the same, I have disclosed and claimed a new gum and method of making it, which method, when briefly stated, consists in forming a crystalline product from a mixture of acetone and phenol to which is added a small quantity of acid, in order to produce a compound, which I believe to be dioxy-diphenyl-dimethyl-methane. In the said application, this compound is then further acted upon by formaldehyde in order to produce a further tenacious product constituting the said new gum above mentioned, but the latter is not necessarily used in this invention. This compound dioxy-diphenyl-dimethyl-methane is of a crystalline form, and soluble in alcohol, ether, acetone, glacial acetic acid, amyl alcohol, amyl acetate and acetylene tetra-chlorid, and mixtures of these, as well as many other solvents not necessary to mention. Accordingly, in making moving picture films, or other photographic films, out of this said compound and cellulose acetate, I preferably provide a mixture containing say twenty-five parts by weight of the said dioxy-diphenyl-dimethyl-methane and seventy-five parts by weight of cellulose acetate. This mixture is then dissolved preferably in acetone to the proper consistency, and I force the solution through the usual slit employed in making films, and further proceed in the manner well known to those skilled in the art. For example, the method of making photographic films disclosed on page 847 and following, vol. 2 of the publication entitled "*Nitro Cellulose Industry*", Worden, edition of 1911, may be followed, and the method of making pyroxylin sheets disclosed on page 853 and following, of said publication, may be employed for making the moving picture films. But, of course, any other suitable and well known method may be followed, if desired.

The films when produced by the method above mentioned, or in any other manner, may then be coated with the photographic emulsion, exposed and developed in the usual way, or when it is desired to make the films especially non-inflammable and to impart an extra hard surface thereto, I preferably pass the same, before coating them with an emulsion, through a bath consisting of a thin solution of my novel gum above mentioned, dissolved preferably in alcohol. This said coating serves as an efficient protection against sparks or other ignited material, which may come in contact with the surface of the film.

The films, whether coated with the gum or not, will be transparent, and non-inflammable in the sense that they will only burn when kept constantly in the flame. But, if coated with the gum, as above mentioned, they will be less liable to be ignited when a spark falls upon one of their flat surfaces.

These said films are found to be exceedingly strong and tenacious when compared with the films now in use, they take the emulsion well, and may be developed in the usual manner.

In order to cause the gum coating to harden quickly, I prefer to make the gum solution acid in reaction by adding a sufficient quantity of acid thereto, whereupon the said gum will go into its hard and insoluble condition without the application of the temperatures mentioned in my said patent above.

It is obvious that those skilled in the art may vary the details of procedure as well as the properties and qualities of my film without departing from the spirit of my invention, for example, homologues of acetone such as ethyl methyl ketone or di-ethyl ketone may be used, and cresol may be used instead of phenol. Therefore, I do not wish to be limited to the above disclosure except as may be required by the claims.

What I claim is:—

1. A photographic film containing a condensation product of a ketone and a phenol in the form of a thin slow burning sheet.

2. A moving picture film substantially composed of a mixture of a cellulose ester and a condensation product of a ketone and a phenol in the form of a ribbon capable of allowing light to pass therethrough.

3. A moving picture film in the form of a transparent ribbon and composed of a mixture of cellulose acetate and a condensation product of acetone and phenol.

4. A moving picture film substantially composed of a mixture of cellulose acetate and a condensation product of acetone and phenol in the form of a transparent ribbon and coated with a condensation product of a ketone, a phenol and an aldehyde.

In testimony whereof, I affix my signature, in presence of two witnesses.

WALLACE APPLETON BEATTY.

Witnesses:
T. A. WITHERSPOON,
R. M. PARKER.